United States Patent [19]

Stoneham

[11] Patent Number: 4,991,063
[45] Date of Patent: Feb. 5, 1991

[54] PHOTOGRAPHIC FLASH APPARATUS
[75] Inventor: Jeffrey R. Stoneham, Hilton, N.Y.
[73] Assignee: Eastman Kodak Company, Rochester, N.Y.
[21] Appl. No.: 539,491
[22] Filed: Jun. 18, 1990
[51] Int. Cl.⁵ .............................................. F21Y 13/04
[52] U.S. Cl. ..................................... 362/18; 362/282; 362/308
[58] Field of Search ................. 362/3, 16, 17, 18, 277, 362/282, 308, 318, 322

[56] References Cited
U.S. PATENT DOCUMENTS

| | | | |
|---|---|---|---|
| 3,167,256 | 1/1965 | Elliott | 240/1.3 |
| 3,843,878 | 10/1974 | Ueda et al. | 362/17 |
| 4,066,884 | 1/1978 | Taylor | 362/16 |
| 4,084,168 | 4/1978 | Pizzuti et al. | 354/126 |
| 4,171,887 | 10/1979 | Hayata | 354/126 |
| 4,175,279 | 11/1979 | Asaki | 362/18 |
| 4,176,930 | 12/1979 | Imura | 354/59 |
| 4,333,127 | 6/1982 | Alkewa et al. | 362/18 |
| 4,352,546 | 10/1982 | Iwata et al. | 354/126 |
| 4,666,280 | 5/1987 | Miyawaki et al. | 362/18 |

Primary Examiner—Stephen F. Husar
Assistant Examiner—Richard R. Cole
Attorney, Agent, or Firm—Roger A. Fields

[57] ABSTRACT

In a photographic flash apparatus, a flash tube produces a brilliant flash of light, a reflector concentrates the light produced by the flash tube into a beam having a particular angle of coverage and redirects the light toward a subject to be illuminated, and an optical element is positioned across the beam to change the angle of coverage of the beam from that effected by the reflector. According to the invention, the optical element is supported for movement only within the beam, but out of its position crosswise of the beam to permit the reflector to restore the beam substantially to the angle of coverage effected by the reflector. This provides an improved compact design for use with dual mode telephoto/wide angle cameras, for example.

11 Claims, 2 Drawing Sheets 4,991,063

PHOTOGRAPHIC FLASH APPARATUS

BACKGROUND OF THE INVENTION

1. Field of the Invention

The invention relates generally to the field of photography, and in particular to an improved photographic flash apparatus.

2. Description of the Prior Art

Electronic flash, as used in photography, is produced by an instantaneous electric discharge between two electrodes in a gas-filled glass tube. The tube is invariably mounted in a reflector to concentrate the light produced by the tube into a beam and redirect it toward a subject to be illuminated. The most efficient shape of the reflector is a parabola which concentrates the light into a beam that may have parallel, converging or diverging rays according to whether the tube is at the focal point of the parabola, in front of the focal point or behind it. Typically, the reflector is fitted with a transparent or translucent screen positioned substantially perpendicular to the beam at an open end of the reflector. The screen acts as a diffuser, softening the light and spreading it more evenly over the subject. However, this only covers the angle of view of a normal camera lens. When used with wide angle lenses, the flash unit may not illuminate the subject completely or evenly.

Various devices have been proposed to change the angle of coverage of the beam of light emitted from the reflector to conform with the selection of objective lens type, i.e. telephoto, wide angle, or normal. U.S. Pat. Nos. 4,176,930, issued Dec. 4, 1979, and No. 4,171,887, issued Oct. 23, 1979, each disclose a camera having a built-in flash unit with an auxiliary Fresnel lens or diffusion plate slidable to respective positions crosswise of the beam or removed from the beam in accordance the selection of different focal length objective lenses. The devices disclosed in these patents disadvantageously add to the size of the camera. U.S. Pat. No. 3,167,256, issued Jan. 26, 1965, discloses a flash unit adapted for use with several replaceable, removable lens plates each having a different optical property which is intended to match the film type or objective lens selected. With this device, it is possible for the user to lose one or more of the replaceable lens plates.

SUMMARY OF THE INVENTION

In a photographic flash apparatus, a flash tube produces a brilliant flash of light, a reflector concentrates the light produced by the flash tube into a beam having a particular angle of coverage and redirects the light toward a subject to be illuminated, and an optical element is positioned crosswise of the beam to change the angle of coverage of the beam from that effected by the reflector. According to the invention, the optical element is supported for movement only within the beam, but out of its position crosswise of the beam to permit the reflector to restore the beam substantially to the angle of coverage effected by the reflector. This provides an improved compact design for use with dual mode telephoto/wide angle cameras, for example.

DETAILED DESCRIPTION OF THE PREFERRED EMBODIMENT

The invention is disclosed as being embodied preferably in an electronic flash unit for a 35 mm still camera which is capable of telephoto and wide angle picture-taking. Because the features of this type of flash unit and camera are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
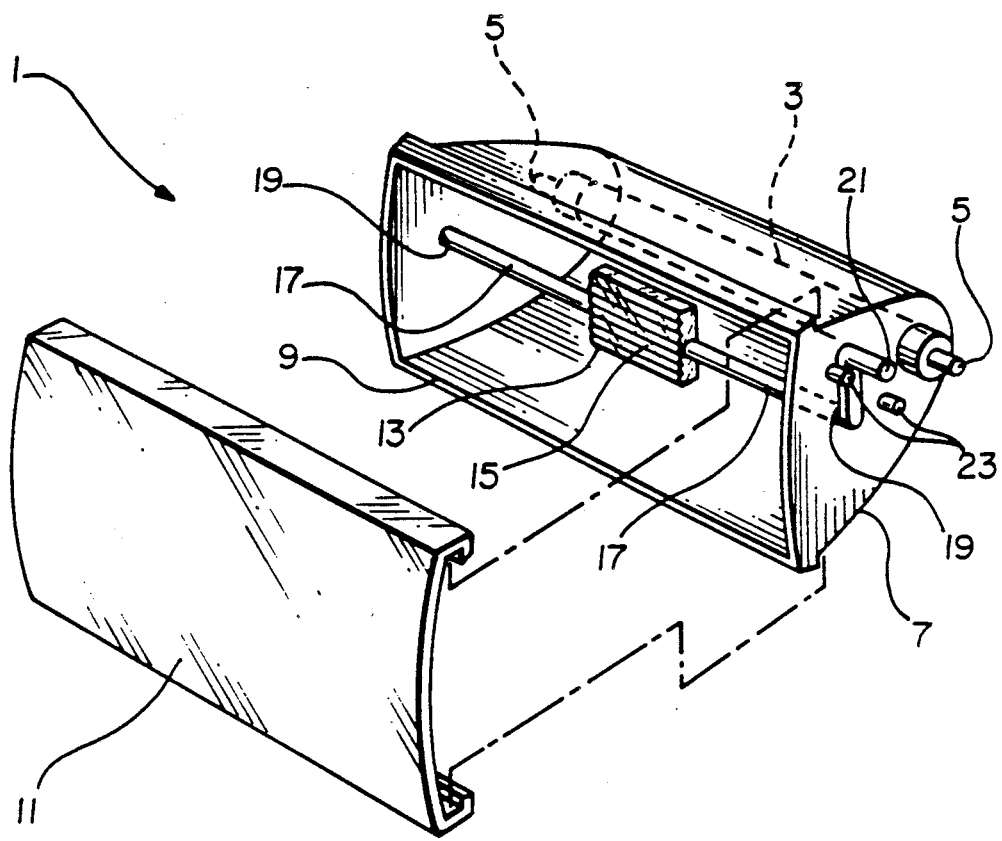
FIG. 1 is a perspective view of a flash apparatus according to a preferred embodiment of the invention.
Figure 2:
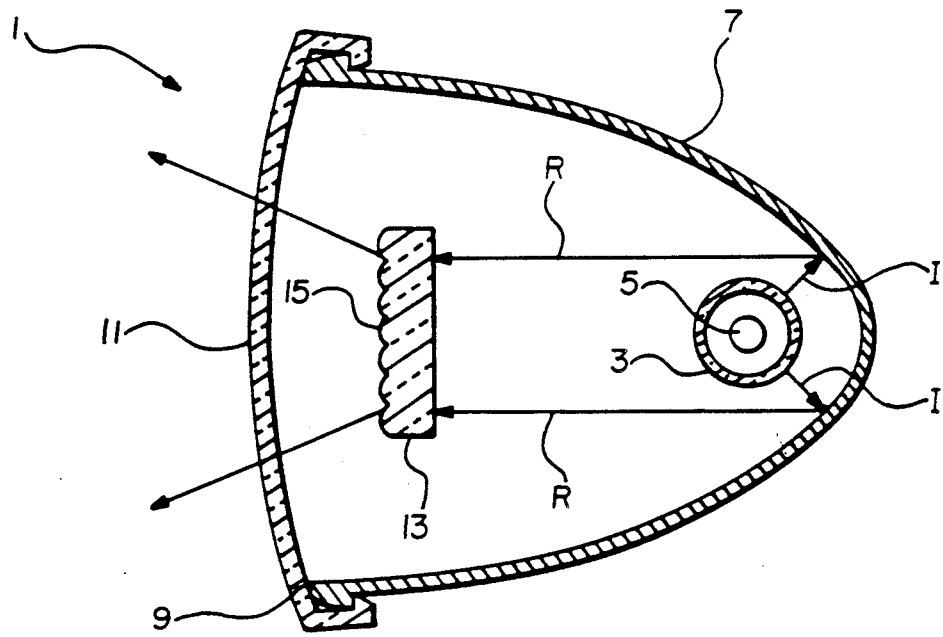
FIG. 2 is a cross-sectional view of the flash apparatus operating in a light-diffusing capacity.

Referring now to the drawings and in particular to FIGS. 1 and 2, there is shown an improved flash unit 1. The flash unit 1 includes a conventional gas-filled, glass, flash tube 3 having a pair of oppositely disposed electrodes 5, each of which is adapted to be connected to a source of electrical energy, preferably in the form of a high voltage capacitor (not shown). The flash tube 3 is mounted in a known plastic reflector 7 having a concave, silvered interior to concentrate the light produced by the flash tube into a beam and redirect it through an open end 9 of the reflector toward a subject to be illuminated. Preferably, the reflector 7 is in the shape of a parabola and the flash tube 3 is positioned at the focal point of the parabola to concentrate the light into a beam that has parallel reflected rays R stemming from diverging incident rays I. See FIG. 3. Alternatively, the shape of the reflector 7 may be different or the flash tube 3 may be positioned in front of the focal point of the parabola or behind it to concentrate the light into a beam that has converging or diverging reflected rays. The reflector 7 is fitted with a known cover screen 11 at the open end 9 of the reflector. The cover screen 11 is transparent plastic and acts as a shield to protect the flash tube 3 and the silvered interior of the reflector 7.

Figure 3:
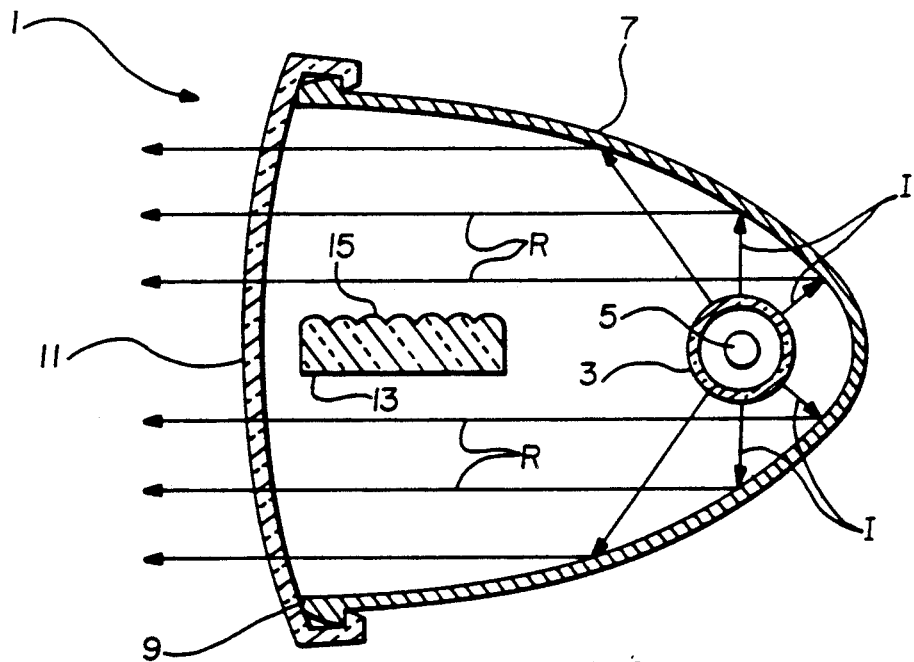
FIG. 3 is a cross-sectional view of the flash apparatus operating in a non-diffusing capacity.

According to the invention, a diffuser 13 is supported within the reflector 7 at a location between the flash tube 3 and the cover screen 11 for pivoting to diffusing and non-diffusing positions shown in FIGS. 2 and 3, respectively. The diffuser 13 is a glass or plastic translucent plate having a finely ground face 15 for scattering or diffusing the light produced by the flash tube 3. In the diffusing position, the diffuser 13 is oriented substantially perpendicular to the beam, i.e. the parallel reflected rays R, to change the angle of coverage of the beam from that effected by the reflector 7, by spreading the parallel reflected rays to thereby increase such angle. In the non-diffusing position, the diffuser 13 is oriented substantially parallel to the beam, i.e. the parallel reflected rays R, to permit the reflector 7 to restore the beam substantially to the angle of coverage effected by the reflector. The non-diffusing position may be selected automatically or manually when a telephoto or normal objective lens is used in a camera (not shown), and the diffusing position may be selected automatically or manually when a wide angle objective lens is used in the camera.

To support the diffuser 13 for pivoting to the diffusing and non-diffusing positions, the diffuser is fixed at its opposite sides to a pair of identical rod-like members 17 which are rotatably mounted within respective journals or openings 19 in opposite sides of the reflector 7. One of the rod-like members 17 includes an external handle 21 which may be manually swung first in a clockwise direction in FIG. 1 to pivot the diffuser 13 from the diffusing position to the non-diffusing position and then in a counter-clockwise direction to return the diffuser to the diffusing position. See FIGS. 2 and 3. A pair of stops 23 fixed to the reflector 7 are arranged to limit movement of the handle 21 to prevent the diffuser 13 from being pivoted beyond the diffusing and non-diffusing positions.

The invention has been described with reference to a preferred embodiment. However, it will be appreciated that variations and modifications can be effected within the ordinary skill in the art without departing from the scope of the invention. For example, instead of using the diffuser 13 a concave or convex lens element or a Fresnel lens may be employed to spread or narrow the beam of light produced by the flash tube 3. According to another example, the reflector instead of being a parabola may have another known shape.

I claim:

1. An improved photographic flash apparatus wherein a flash tube produces a brilliant flash of light, a reflector concentrates the light produced by said flash tube into a beam having a particular angle of coverage and redirects the light toward a subject to be illuminated, and an optical element is positioned crosswise of the beam to change the angle of coverage of the beam from that effected by said reflector, and wherein the improvement comprises:

means for supporting said optical element for movement only within the beam, but out of its position crosswise of the beam to permit said reflector to restore the beam substantially to the angle of coverage effected by the reflector.

2. A photographic flash apparatus as recited in claim 1, wherein said reflector has an open end remote from said flash tube for passage of the beam of light, a cover screen covers said open end of the reflector, and said optical element is located between said cover screen and said flash tube.

3. A photographic flash apparatus as recited in claim 1 or 2, wherein said supporting means includes integral means directly connecting said reflector and said optical element for pivoting the optical element only within the beam of light.

4. A photographic flash apparatus as recited in claim 1, wherein the shape of said reflector is generally a parabola to concentrate the light produced by said flash tube into a beam having substantially parallel rays, and said supporting means includes integral means for supporting said optical element for pivoting within the beam to respective positions substantially perpendicular to the beam and substantially parallel to the beam.

5. An improved photographic flash apparatus wherein a flash tube produces a brilliant flash of light, a reflector concentrates the light produced by said flash tube into a beam and redirects the light toward a subject to be illuminated, and an optical element is positioned crosswise of the beam to diffuse the light, and wherein the improvement comprises:

means for supporting said optical element for movement only within the beam, but out of its position crosswise of the beam to substantially cease to diffuse the light.

6. An improved photographic flash apparatus wherein a flash tube produces a brilliant flash of light, a reflector is concave to concentrate the light produced by said flash tube into a beam having substantially parallel rays, and an optical element is positioned substantially perpendicular to the beam to affect the light, and wherein the improvement comprises:

means for supporting said optical element for movement only within the beam, but out of its position substantially perpendicular to the beam to a position substantially parallel to the beam to substantially cease to affect the light.

7. An improved photographic flash apparatus wherein a flash tube produces a brilliant flash of light, a reflector including an open end concentrates the light produced by said flash tube into a beam having a particular angle of coverage and redirects the light through said open end toward a subject to be illuminated, and an optical element is positioned crosswise of the beam to change the angle of coverage of the beam from that effected by said reflector, and wherein the improvement comprises:

a cover screen covering said open end of said reflector; and means for supporting said optical element at a location between said flash tube and said open end of said reflector for movement out of its position crosswise of the beam to permit the reflector to restore the beam substantially to the angle of coverage effected by the reflector.

8. A photographic flash apparatus as recited in claim 7, wherein said supporting means includes integral means for limiting movement of said optical element to only within the beam of light.

9. A photographic flash apparatus as recited in claim 7, wherein said reflector is concave to concentrate the light produced by said flash tube into a beam having substantially parallel rays, and said supporting means includes integral means for supporting said optical element for movement within the beam to respective positions substantially perpendicular to the beam and substantially parallel to the beam.

10. A photographic flash apparatus as recited in claim 7, wherein said supporting means includes integral means directly connecting said reflector and said optical element for movement of the optical element.

11. A photographic flash apparatus as recited in claim 7, wherein said reflector includes means for preventing movement of said optical element beyond its positions substantially perpendicular to the beam of light and substantially parallel to the beam.

* * * * *